United States Patent [19]

Bartholomew

[11] Patent Number: 4,583,650
[45] Date of Patent: Apr. 22, 1986

[54] MANUALLY RELEASABLE DRAINPORT CLOSURE APPARATUS

[75] Inventor: Donald D. Bartholomew, Marine City, Mich.

[73] Assignee: Proprietary Technology, Southfield, Mich.

[21] Appl. No.: 710,462

[22] Filed: Mar. 11, 1985

Related U.S. Application Data

[63] Continuation-in-part of Ser. No. 523,847, Aug. 17, 1983, Pat. No. 4,508,234.

[51] Int. Cl.⁴ .............................................. B65J 55/02
[52] U.S. Cl. .................................... 215/206; 215/211; 215/216; 222/522
[58] Field of Search ............... 215/206, 211, 216, 355; 222/522

[56] References Cited

U.S. PATENT DOCUMENTS

| 1,567,084 | 12/1925 | Rose | 222/522 |
| 2,772,037 | 11/1956 | Rieke | 222/522 X |
| 2,935,219 | 5/1960 | Smith | 215/211 |
| 3,623,622 | 11/1971 | Sullivan | 215/216 X |
| 3,642,161 | 2/1972 | Stroud | 215/216 X |
| 4,508,234 | 4/1985 | Bartholomew | 215/206 |
| 4,516,691 | 5/1985 | Christine et al. | 222/522 X |

*Primary Examiner*—Steven M. Pollard
*Attorney, Agent, or Firm*—Harness, Dickey & Pierce

[57] ABSTRACT

A drainport closure device particularly suitable for a motor vehicle radiator drain valve. The device is composed of a housing and plug member. The housing communicates with a fluid containing vessel at one end and the other end receives the plug. The plug has one or more flexing arms which may be compressed to permit the plug to be moved between two positions within the housing. In the first position an "O"-ring seal carried by the plug prevents fluid drainage whereas when the plug is repositioned to a second position, fluid drainage occurs.

8 Claims, 11 Drawing Figures

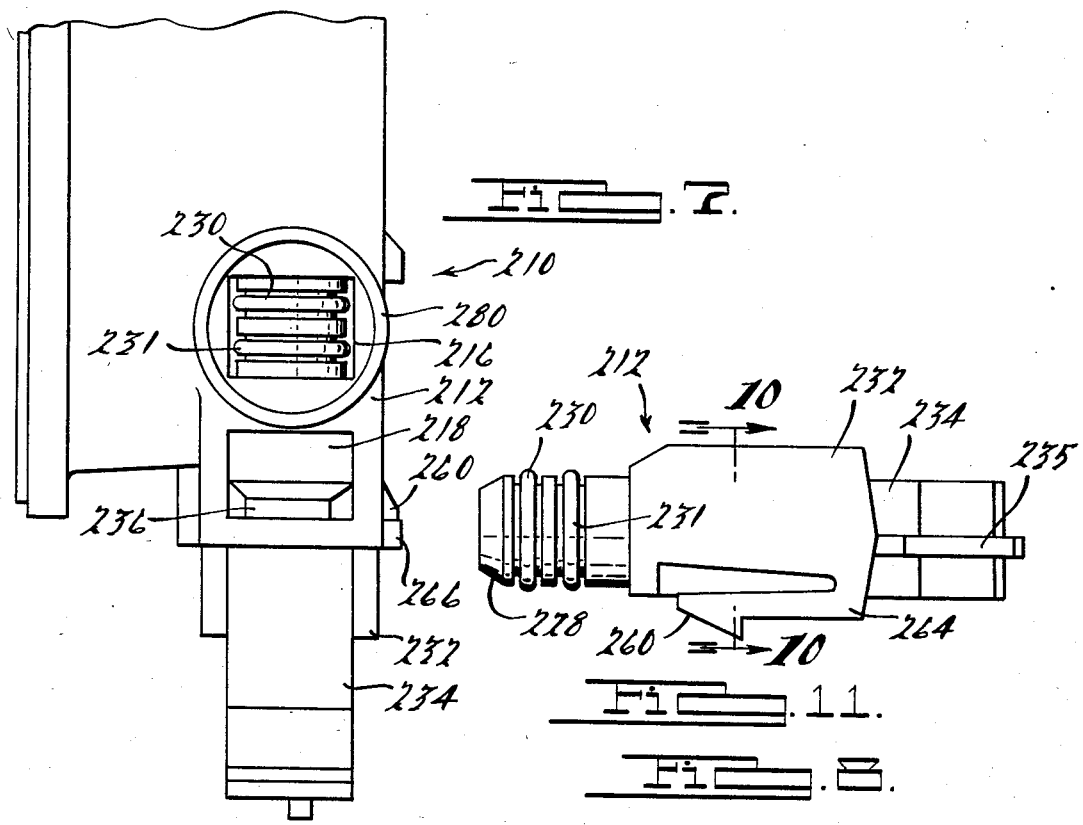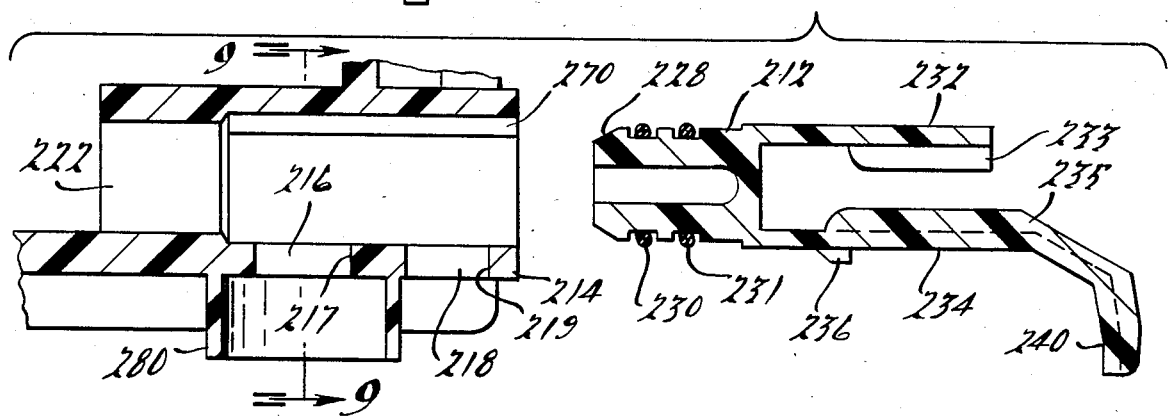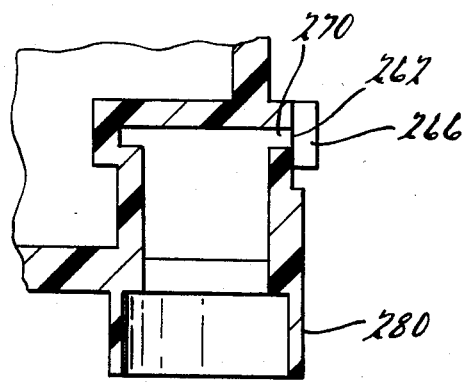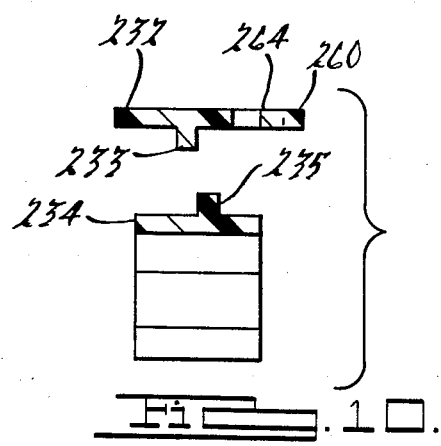

MANUALLY RELEASABLE DRAINPORT CLOSURE APPARATUS

CROSS-REFERENCE TO RELATED APPLICATION

This application is a continuation-in-part of co-pending application Ser. No. 523,847 filed Aug. 17, 1983, now U.S. Pat. No. 4,508,234, issued Apr. 2, 1985, entitled "Manually Releasable Drainport Closure".

BACKGROUND OF THE INVENTION

This invention relates to a fluid drain valve and particularly to an improved manually releasable drainport closure. The drainport closure according to this invention is particularly useful for implementation as a drain closure for a motor vehicle radiator to permit coolant draining therefrom.

Conventionally used drainport closures for motor vehicles comprise a screw type valve having a wing head for hand rotation and are often referred to as "petcocks." A hollow threaded member of a conventional petcock seats within an internally threaded metal socket. Upon rotation of the screw plug, fluid is permitted to drain through the interior of the plug. This configuration permits coolant which may be at an elevated temperature or a corrosive liquid to come in contact with the operator loosening the petcock. Conventional petcocks are prone to failure due to corrosion of the metal parts over time. Moreover, conventionally designed petcocks tend to be expensive due to the requirement of a number of metal machine parts. Often times a corroded petcock cannot be easily released thereby requiring the use of tools or cannot be removed without causing permanent damage to the components.

The improved manually releasable drainport closure according to this invention overcomes the above shortcomings of such valves according to the prior art. The drainport closure according to this invention is easily hand operated, is not subject to corrosion damage and is much less expensive to fabricate than those designs according to the prior art. Moreover, the drainport closure disclosed herein may be easily intentionally removed and yet is difficult to remove through inadvertence.

SUMMARY OF THE INVENTION

The improved manually releasable drainport closure according to this invention includes a housing member which is communicated with a fluid containing vessel such as a radiator to be drained. A first housing end communicates with the vessel and a plug member is inserted within a second housing end. The plug member includes a pair of arms, one of which is flexible and to which a latching tang is attached. The tang is displaceable between a locked and unlocked position through grasping the flexing arm of the plug and squeezing the arms together. This configuration permits the operator to squeeze the flexing arm and partially removing the plug from the body thereby permitting fluid drainage from the vessel. A second latching tang is provided to prevent the inadvertent complete removal of the plug from the housing.

Additional benefits and advantages of the present invention will become apparent to those skilled in the art to which this invention relates upon a reading of the described preferred embodiments of this invention taken in conjunction with the accompanying drawings.

DESCRIPTION OF THE DRAWINGS

FIG. 7 is an elevational view of the improved drainport closure value according to a third embodiment of the invention showing a housing portion associated with a fluid containing vessel and a plug member inserted within the housing in a drain position.

FIG. 8 is a cross sectional view of the improved drainport closure value according to the third embodiment of the invention showing the housing portion and the plug member removed therefrom.

FIG. 9 is a cross sectional view taken along line 9—9 of FIG. 8.

FIG. 10 is a cross sectional view taken along line 10—10 of FIG. 8.

FIG. 11 is an elevational view of the plug member.

DETAILED DESCRIPTION OF THE INVENTION

Figure 1:
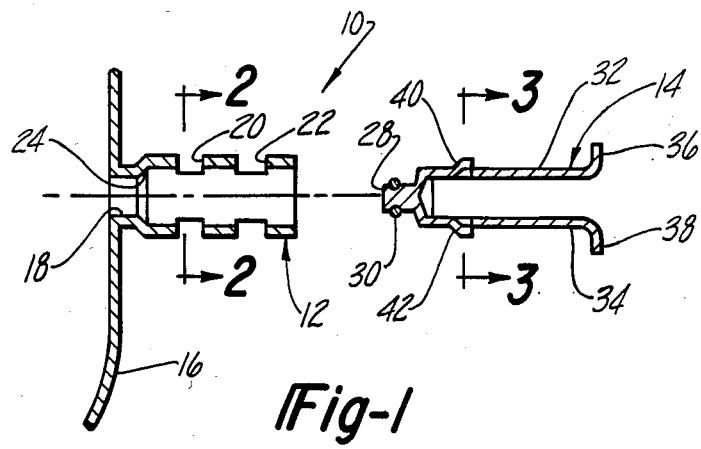
FIG. 1 is a cross sectional view of the improved drainport closure valve according to the first embodiment invention showing a housing portion associated with the fluid containing vessel and the plug member insertable within the housing but removed therefrom.
Figure 2:
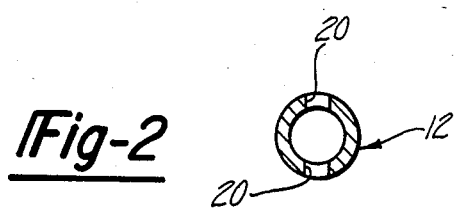
FIG. 2 is a cross sectional view taken along line 2—2 of FIG. 1.
Figure 3:
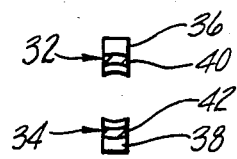
FIG. 3 is a cross sectional view taken along line 3—3 of FIG. 1.

A first embodiment of an improved drain closure according to this invention is shown with reference to FIGS. 1 through 3 and is generally designated by reference character 10. Closure 10 is composed of two primary components, housing portion 12 and plug member 14. Housing 12 communicates with a fluid contained vessel 16 via port 18. Housing 12 of the first embodiment has a substantially circular cross section as is evident by referring to FIG. 2. Two sets of apertures 20 and 22 are provided at two different longitudinal positions along the housing. Apertures 20 and 22 partially encircle housing member 12 as shown with reference to FIG. 2. Tapered portion 24 is provided which acts as a transition between port 18 and the inner diameter of housing 12. Housing 12 may be formed integrally with fluid containing vessel 16 or may be otherwise fastened thereto, for example, by providing a threaded connection or by brazing or soldering.

Plug member 14 of the first embodiment includes center post 28 which provides a seat for "O"-ring 30 by an annular groove therein. Plug 14 also provides two flexing arm segments 32 and 34 having outwardly projecting legs 36 and 38 as is evident from FIG. 1. By grasping legs 36 and 38, flexing arms 32 and 34 are deflected toward one another. When arms 32 and 34 are so deflected, latching tangs 40 and 42 are also caused to move toward the center of plug 14. Tags 40 and 42 are spaced radially such that in a nondeflected position they project within one of apertures 20 or 22 whereas when the arms are deflected inwardly plug 14 may be repositioned within the inner diameter portion 26 of housing 12. This configuration permits plug 14 to be inserted in a first position within housing 12 such that "O"-ring 30 tightly fits within port 18 thereby preventing fluid leakage from vessel 16. In this first position, latching tangs 40 and 42 are positioned within aperture 20. Therefore, even if a high fluidic hydrostatic pressure exists within vessel 16, plug member 14 is prevented from inadvertent expulsion. If drainage of vessel 16 is desired, flexing arms 32 and 34 are manually displaced toward one another thereby causing retraction of tangs 40 and 42 permitting plug 14 to be partially withdrawn from housing 12. When plug 14 is so withdrawn, "O"-ring 30 is removed from port 18 permitting fluid drainage from vessel 16 through aperture 20. Aperture 22 positioned further from vessel 16 than aperture 20 is provided to permit plug 14 to be latched in a second position thereby preventing it from being completely withdrawn from housing 12 thus preventing loss or damage. Moreover, shoulder portion 44 formed by plug 14 has a diameter which is closely received by inner diameter 26 of housing 12 such that fluid flow between housing 12 and plug 14 is prevented. Consequently, the operator's hand will not become exposed to contact with potentially hot or corrosive fluids which may be draining from vessel 16.

Transition portion 24 of plug 14 provides a means of compressing "O"-ring within port 18 as the plug is moved from the second draining position to the first position. The edges of aperture 20 and latching tangs 40 and 42 are configured to provide a positive locking engagement and may be designed such that deflection of arms 32 and 34 will cause plug 14 to be moved slightly into vessel 16 before it can be moved to the second draining position. The edges will be designed to provide the desired latching effect and actuation effort for the given application according to well known principles. It may be further desirable to provide a means such as a groove to prevent relative rotation between housing 12 and plug 14 such that apertures 20 and 22 remain in registry with latching tangs 40 and 42.

Figure 4:
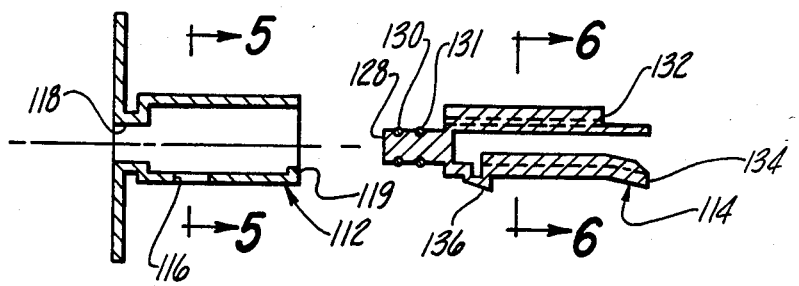
FIG. 4 is a cross sectional view of an improved drain closure according to a second embodiment of an improved drain closure according to this invention showing a housing portion communicating with the fluid containing vessel and a separate plug member insertable within the housing but removed therefrom.
Figure 5:
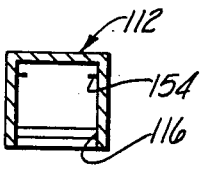
FIG. 5 is a cross sectional view taken along line 5—5 of FIG. 4.
Figure 6:
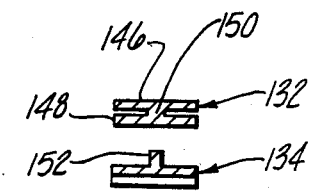
FIG. 6 is a cross sectional view taken along line 6—6 of FIG. 4.

A second embodiment according to this invention is shown with reference to FIGS. 4 through 6 and is generally designated by reference character 110. Like the first embodiment, this embodiment is composed of two primary components housing portion 112 and plug 114. These members, however, have a square or rectangular cross section as is evident by reference to FIG. 5 and FIG. 6. Housing 112 includes aperture 116 formed within the bottom surface of the housing. Like the first embodiment, housing 112 communicates with a fluid containing vessel 116 via a port 118. Housing portion 112 further forms detent 119 formed along the bottom outer edge of housing 112 furthest from vessel 116. Plug member 113 includes a pair of "O"-rings 130 and 131 seated within grooves formed by centerpost 128. Plug member 114 forms latching tang 136.

Operation of the second embodiment is essentially identical with that of the first embodiment. Arm 134 is manually deflected toward arm 132 thereby causing retraction of tang 136 from aperture 116. Top arm 132 is reinforced by providing top and bottom plate portions 146 and 148 connected to enter web 150 thereby forming an I-beam like cross section which resists deflection. Bottom arm 134 is reinforced by web 152 but has a lower modulus of deflection than top arm 132 such that when a given load is applied to both arms, the bottom leg will deflect inwardly more than the top arm 132. Detent means 119 is provided to prevent complete withdrawal of plug member 114 from housing 112. Incorrect installation of plug 114 within housing 112 during assembly is prevented by providing ribs 154 formed by the housing which engage the space beytween elements 146 and 148 of top arm 132. As an alternative means of preventing plug 114 from being installed sideways or inverted within housing 112, top arm 132 may be formed having a lateral dimension greater than bottom arms 132 in which case housing 112 would form a slot for the insertion of the arm. The construction of the second embodiment is particularly suitable for the implementation of plastic molded materials. A particular advantage of the second embodiment is the square cross sectional configuration which prevents relative rotation between plug member 114 and housing 112 such that tang 136 and aperture 116 remain in an operably associated position. Further, by providing two "O"-rings 130 and 131, a redundant sealing system results.

It should be noted that aperture 22 of the first embodiment and detent 119 of the second embodiment are not necessary elements for the practice of the invention. These elements are provided only to discourage or prevent complete withdrawal of plug members 14 and 114.

A third embodiment of an improved drain closure according to this invention is shown with reference to FIGS. 7–10 and is generally designated by a reference character 210. As in the first two embodiments, this embodiment is composed of two primary components, a housing portion 212 and a plug 214. As is evident by reference to FIGS. 9 and 10, these members have a square or retangular cross section. The housing 212 includes apair of apertures 216 and 218 formed within the bottom surface of the housing. As in the first two embodiments, the housing 212 communicates with a fluid containing vessel 220 via a port 222. Plug member 214 includes a pair of O-rings 230 and 231 seated within grooves formed by centerpost 228. Plug member 214 forms latching tang 236.

Operation of this third embodiment is similar to that of the first two embodiments. The latching arm 234 is manually deflected toward the stationary arm 232 thereby causing retraction of the tang 236 from either the aperture 216 or the aperture 218. The stationary arm 232 is reinforced by a web 233 and has a lateral width greater than the latching arm. The latching arm 234 is also reinforced by a web 252, but is more readily deflected as it has a greater length and an outwardly projecting leg 240 such that a larger deflecting moment will occur at the latching tang 236. When completely inserted into the housing 212, the plug 214 is in a first position which prohibits the flow of the viscus fluid from the vessel 220 via the port 222. In this first position, the latching tang 236 is inserted in the aperture 216 and is engaged aganst the surface 217. When the plug is withdrawn into a position which would allow the viscus fluid to flow from the vessel 220 via the port 222 and through the aperture 216, the latching tang is inserted in the aperture 218. The latching tang 236 engages the surface 219 of the aperture 218 to prevent the removal of the plug 214 from the housing portion 212. A second tang 260 is provided on the top arm 232 insertable in a slot 262 in the housing 212 to prevent the inadvertent removal of the plug 214 from the housing 212. The tang 260 is located on a flange 264 of the stationary arm 232, which is deflectable such that the tang 260 may be withdrawn past the surface 270 of the slot 262. Thusly, the entire plug 214 is removable such that the O-rings may be replaced or such that the entire plug may be replaced or cleaned.

Incorrect installation of the plug 214 within the housing 212 is prevented by providing the stationary arm 232 with a lateral width greater than the latching arm 234, and providing the housing with slots 270 which receive the stationary arm 232. The square cross sectional configuration of this embodiment prevents relative rotation between the plug member 214 and the housing 212 such that the tang 236 and the apertures 216 and 218 remain in an operably associated position. Further, the two O-rings 230 and 231 provide a redundant sealing system as in the second embodiment. An aperture shield 280, is provided to protect the aperture 216 from foreign particles, and to provide for a more one directional flow of the viscus fluid when the plug is in its second position.

Preferred embodiments of the invention have been described herein. It will be appreciated that various modifications or changes may be made without departing from the spirit and scope of the appended claims.

I claim:

1. A drainport closure apparatus for a fluid containing vessel comprising:
    a housing portion having first and second end, said first end communicating with said vessel and forming a port, said housing further forming at least one aperture,
    a plug member slidably received by said housing having a center post and forming two legs, wherein one or more tangs are formed by a first leg of said legs, said first leg being manually deflectable toward the other thereby causing one of said tangs to be moved into and out of engagement with said aperture thereby permitting said plug to be positioned within said housing between a first and a second position, and said first leg being greater in length than said other leg, and
    seal means carried by said plug member center post, said seal means preventing flow through said port when said plug is in said first position, said seal means allowing fluid drainage from said vessel when said plug is moved to said second position.

2. The drainport closure apparatus according to claim 1 further comprising a second leg of said legs further forming a second tang whereby said second tang engages a slot formed in said housing when said plug is in said second position thereby preventing said plug from being removed from said housing.

3. The drainport closure apparatus according to claim 2 wherein said second leg forms a flexible arm containing said second tang whereby said arm is deflectable such that said second tang may be moved into and out of engagement with said slot thereby permitting said plug to be removed from said housing.

4. The drainport closure apparatus according to claim 1 further comprising said housing further forming an aperture shield surrounding said first aperture.

5. The drainport closure apparatus according to claim 1 further comprising anti-rotation means preventing relative rotation between said housing portion and said plug member.

6. The drainport closure apparatus according to claim 1 further comprising means for insuring that said plug is properly installed within said housing during assembly by providing said plug and said housing with cross sectional shapes which cooperate only when said plug and said housing are matched in a desired orientation.

7. The drainport closure apparatus according to claim 6 wherein said second leg is provided with a width perpendicular to the direction of said manual deflection of said first leg greater than the width of said first leg.

8. The drainport closure apparatus according to claim 1 wherein said housing forms a slot configured to receive said leg.

* * * * *

UNITED STATES PATENT AND TRADEMARK OFFICE
CERTIFICATE OF CORRECTION

PATENT NO. : 4,583,650

DATED : April 22, 1986

INVENTOR(S) : Donald D. Bartholomew

It is certified that error appears in the above-identified patent and that said Letters Patent is hereby corrected as shown below:

Column 2, line 6; "the" should be --a--

Column 3, line 30; after "O-ring" insert --30--

Column 4, line 7-8; "beytween" should be --between--

Column 6, line 39; after "said" insert --second--

Signed and Sealed this

Thirteenth Day of January, 1987

*Attest:*

DONALD J. QUIGG

*Attesting Officer*  *Commissioner of Patents and Trademarks*